United States Patent
Kwon et al.

(10) Patent No.: US 11,936,033 B2
(45) Date of Patent: Mar. 19, 2024

(54) ELECTRODE TAB-FEEDING DEVICE INCLUDING GUIDE FOR POSITIONING ELECTRODE TAB AT CORRECT POINT

(71) Applicant: LG Chem, Ltd., Seoul (KR)

(72) Inventors: Tae Hyun Kwon, Gyeonggi-do (KR); Joo Hwan Sung, Daejeon (KR); Hyoung Kwon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1624 days.

(21) Appl. No.: 15/792,982

(22) Filed: Oct. 25, 2017

(65) Prior Publication Data

US 2018/0114969 A1  Apr. 26, 2018

(30) Foreign Application Priority Data

Oct. 26, 2016 (KR) .................. 10-2016-0139827

(51) Int. Cl.
*H01M 50/536* (2021.01)
*H01M 4/04* (2006.01)
*H01M 4/13* (2010.01)
*H01M 4/139* (2010.01)
*H01M 4/36* (2006.01)
*H01M 4/70* (2006.01)
(Continued)

(52) U.S. Cl.
CPC ............. *H01M 4/364* (2013.01); *H01M 4/04* (2013.01); *H01M 4/13* (2013.01); *H01M 4/139* (2013.01); *H01M 4/70* (2013.01); *H01M 10/0404* (2013.01); *H01M 50/533* (2021.01); *H01M 50/536* (2021.01)

(58) Field of Classification Search
None
See application file for complete search history.

(56) References Cited

U.S. PATENT DOCUMENTS

| 4,509,252 | A | * | 4/1985 | Sabatino | ........... H01M 10/0404 29/430 |
| 5,097,878 | A | * | 3/1992 | von Benda | ............. H01M 4/04 141/1.1 |
| 2006/0051652 | A1 | * | 3/2006 | Samuels | .............. B65H 29/241 29/623.1 |

FOREIGN PATENT DOCUMENTS

| CN | 102887364 B | * | 8/2015 |
| KR | 10-2014-0111805 A | | 9/2014 |
| KR | 2014-0142593 A | | 12/2014 |

(Continued)

OTHER PUBLICATIONS

Machine translation of KR 2014-111805 (Kim) (Year: 2014).*
Machine translation of CN 102887364 (Gan) (Year: 2015).*

*Primary Examiner* — Barbara L Gilliam
(74) *Attorney, Agent, or Firm* — Birch, Stewart, Kolasch & Birch, LLP

(57) ABSTRACT

The present disclosure provides a battery tab-feeding device including a battery tab disposed on a non-coating part of an electrode plate during a process of manufacturing an electrode by fusing the battery tab to the non-coating part of an electrode plate, an electrode plate supporting part disposed to support the electrode plate having a first surface exposed from both surfaces of the electrode plate and a tab transferring part disposed to support a battery tab and transfer the battery tab to the non-coating part of the electrode plate. Additionally, a guide part guides the transfer of the battery tab to position a first side edge of the battery tab perpendicular to a first side edge of the electrode plate.

10 Claims, 3 Drawing Sheets

(51) Int. Cl.
*H01M 10/04* (2006.01)
*H01M 50/533* (2021.01)

(56) References Cited

FOREIGN PATENT DOCUMENTS

| KR | 10-2015-0026768 A | 3/2015 |
| KR | 10-2015-0084270 A | 7/2015 |

* cited by examiner

ELECTRODE TAB-FEEDING DEVICE INCLUDING GUIDE FOR POSITIONING ELECTRODE TAB AT CORRECT POINT

CROSS-REFERENCE TO RELATED APPLICATION

This application claims priority to and the benefit of Korean Patent Application No. 10-2016-0139827, filed on Oct. 26, 2016, the disclosure of which is incorporated herein by reference in its entirety.

TECHNICAL FIELD

The present disclosure relates to an electrode tab-feeding device and more particularly, to an electrode tab-feeding device including a guide for disposing an electrode tab at a particular location.

RELATED ART

Recently, secondary batteries have become widely used as power sources for mobile devices such as mobile phones, notebook computers, and camcorders. In particular, the use of lithium secondary batteries has rapidly increased due to advantages that include an increased operating voltage and greater energy density per unit weight. The secondary battery may be classified as a lithium ion battery, a lithium ion polymer battery, or a lithium polymer battery depending on the configuration of an electrode and an electrolyte. Among them, lithium ion polymer batteries are less likely to leak an electrolyte and are more easily manufactured and are thereby increasingly used.

Additionally, requirements for the high capacity of the battery, enlargement of the size of a case and processing with thin materials have increased. Therefore, the use of a pouch-shaped battery having a structure in which a stacked or stacked-folded electrode assembly is embedded in a pouch-shaped case of an aluminum laminate sheet has increased due to the pouch-shaped battery's reduced manufacturing cost, light weight, and ease of shape transformation, etc.

The secondary battery may be classified based on a structure of an electrode assembly composed of a positive electrode, a negative electrode and a separator. Examples thereof may include a layered structure having a spiral arrangement (e.g., jelly-roll or wound type) electrode assembly having a structure in which long sheet-like positive electrodes and negative electrodes are wound with a separator interposed therebetween, a stacked (e.g., laminated) type electrode assembly in which a plurality of positive electrodes and negative electrodes cut to a predetermined size unit are sequentially stacked with a separator interposed therebetween and a stacked/folding type electrode assembly having a structure in which a bi-cell or full cell in which a predetermined unit of positive electrodes and negative electrodes is stacked with a separator interposed therebetween is wound up.

For example, a manufacturing process of an electrode assembly including a stacked structure of a unit electrode includes a process of preparing a positive electrode mixture and a negative electrode mixture, a process of applying the mixtures to a positive electrode current collector and a negative electrode current collector to manufacture sheets-type electrodes made of positive electrodes and negative electrodes, respectively, and a process of forming a battery tab on the electrode. Further the manufacturing process may include a process of pressing the electrode, a process of manufacturing an electrode by slightly slitting the electrode to a desired size, a process of vacuum drying, a process of forming an electrode assembly composed of a positive electrode, a negative electrode, and a separator; etc.

In particular, the process of forming the battery tab includes a method of machining using an apparatus capable of cutting along an area where the tab is to be formed proximate to an end part of an electrode or a method of separately manufacturing a metallic battery tab and fusing the battery tab to a non-coating part of an electrode plate to which the electrode mixture is not coated. In the method of separately manufacturing a metallic battery tab and fusing the battery tab to an electrode plate, a battery tab-feeding device maintains the position of the battery tab of metal material cut to a certain size and transfers the battery tab to one side end part of the electrode plate, and then fuses the electrode plate and the battery tab together through welding between the electrode plate and the battery tab.

A conventional battery tab-feeding device has a problem that when the battery tab is transferred to one side end part of the electrode plate, the battery tab held by a tab transfer unit is displaced to the left and right, thereby being abnormally fused onto the electrode plate and causing defects. In particular, in the case of a layered structure having a spiral arrangement (wound type) electrode assembly having a structure in which long sheet-like positive electrodes and negative electrodes are wound with a separator interposed therebetween, when the tab is formed while including the electrode that is abnormally fused, the defects due to displacement occur during the winding process. Therefore, there is a need to develop a technology that substantially solves these problems and improves the overall transfer accuracy of the battery tab.

The above information disclosed in this section is merely for enhancement of understanding of the background of the disclosure and therefore it may contain information that does not form the prior art that is already known in this country to a person of ordinary skill in the art.

SUMMARY

The present disclosure provides an electrode tab-feeding device that includes a guide for disposing an electrode tab at a particular location.

In an aspect of the disclosure, a battery tab-feeding device may include a battery tab disposed on a non-coating part of an electrode plate during a process of manufacturing an electrode by fusing the battery tab to the non-coating part of the electrode plate, an electrode plate supporting part disposed to support the electrode plate to expose a first surface from both surfaces of the electrode plate, a tab transferring part disposed to support the battery tab and transfer the battery tab to the non-coating part of the electrode plate and a guide part that guides the transfer of the battery tab to disposed a first side edge of the battery tab perpendicular to a first side edge of the electrode plate.

In some exemplary embodiment, the battery tab-feeding device may include the electrode plate supporting part having an electrode plate fixing part that prevents displacement of the electrode plate. In other exemplary embodiments, the battery tab-feeding device may include the electrode plate fixing part being a clip or a clamp.

In other exemplary embodiments, the battery tab-feeding device may include the tab transferring part having an upper holder that prevents displacement of an upper portion of the battery tab and a lower holder that prevents displacement of a lower portion of the battery tab. In some exemplary embodiments, the battery tab-feeding device may include the guide part coupled to the tab transferring part having a shape that protrudes in a direction in which the tab transferring part transfers the battery tab. The battery tab-feeding device may include the upper holder coupled to the guide part.

In some exemplary embodiments, the battery tab-feeding device may include the guide part formed from a metal material. The battery tab-feeding device may include the guide part that prevents lateral displacement of the battery tab during a transferring process. In other exemplary embodiments, the battery tab-feeding may include the guide part having a structure in which an interval is adjusted based on a width of the battery tab. The battery tab-feeding device may include the guide part having an electromagnet member.

In other exemplary embodiments, the battery tab-feeding device may include the electrode plate formed of a coating part coated with an electrode mixture containing an electrode active material on a current collector of a metal sheet and a non-coating part where the electrode mixture is not coated and the metal sheet is exposed.

In another aspect, an exemplary embodiment may include an electrode for a secondary battery manufactured by the battery tab-feeding device.

BRIEF DESCRIPTION OF THE DRAWINGS

The following drawings attached to the specification illustrate exemplary examples of the present disclosure, and serve to enable technical concepts of the present disclosure to be further understood together with detailed description of the disclosure given below, and therefore the present disclosure should not be interpreted only with matters in such drawings.

DETAILED DESCRIPTION

Figure 1:
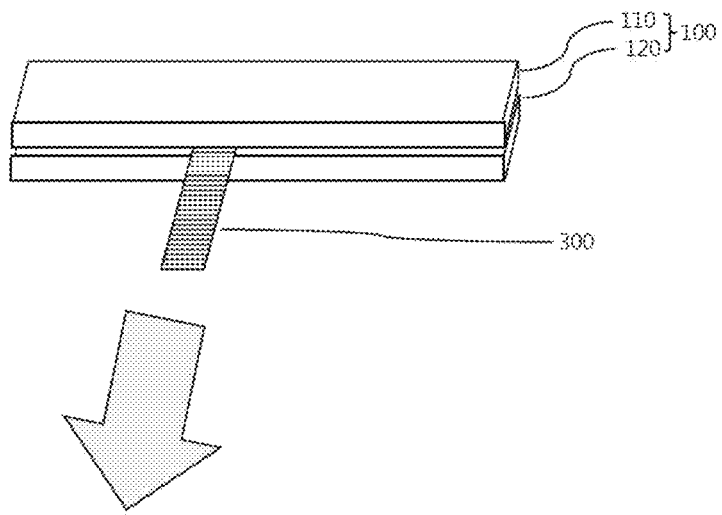
FIG. 1 is an exemplary partial schematic view of a conventional battery tab-feeding device.

Hereinafter, embodiments of the present disclosure will be described with reference to the accompanying drawings. However, the description provided herein is for better understanding of the present disclosure, and the scope of the present disclosure is not limited thereto. However, the description provided herein is for better understanding of the present disclosure, and the scope of the present disclosure is not limited thereto. In describing the exemplary embodiments, thicknesses of lines and dimension of components shown in the drawings may be expressed exaggeratedly for clarity and convenience of description. In addition, terms to be described below are those defined in consideration of functions in the present disclosure, which may vary depending on intention or custom of users or operators. Therefore, definition of these terms should be made based on the contents throughout this specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In particular, the present disclosure provides a battery tab-feeding device which reduces a defect rate of an electrode or a secondary battery by improving accuracy of transferring a battery tab in a process of manufacturing an electrode by fusing the battery tab to an electrode plate.

According to an aspect of the present disclosure, a battery tab-feeding device may include a process of placing a battery tab on a non-coating part of an electrode plate during a process of manufacturing an electrode by fusing the battery tab to the non-coating part of the electrode plate, an electrode plate supporting part disposed to support the electrode plate having a first surface exposed from both surfaces of the electrode plate, a tab transferring part to support the battery tab and transfer the battery tab to the non-coating part of the electrode plate and a guide part that guides the transferring of the battery tab to disposed a first side edge of the battery tab perpendicular to a first side edge of the electrode plate.

Therefore, the battery tab-feeding device including a guide for positioning the battery tab at a particular position according to the present disclosure may reduce the defect rate of the electrode fused with the battery tab and the defect rate of the secondary battery including the same by including the guide part that guides the transfer of the battery tab to dispose a first side edge of the battery tab perpendicular to a first side edge of the electrode plate. In particular, the electrode plate supporting part, and the tab transferring part may be disposed opposite to the direction that the battery tab is transferred. In an exemplary embodiment of the present disclosure, the electrode plate supporting part may further include an electrode plate fixing part to maintain the position of the electrode plate to thereby more accurately control the transfer position and direction when the battery tab is transferred. The specific example of the electrode plate fixing part is not particularly limited when the electrode plate is fixed and may include a clip or a clamp. The tab transferring part may include an upper holder for fixing an upper portion of the battery tab and a lower holder for fixing a lower portion of the battery tab.

The guide part is not limited in its position and specific configuration provided a first (e.g., one) side edge of the battery tab is perpendicular to a first (e.g., one) side edge of the electrode plate to guide the transfer of the battery tab. However, the guide part may be coupled to the tab transferring part in a shape protruding in a direction in which the tab transferring part transfers the battery tab. In particular, the guide part may be coupled to the upper holder of the tab transferring part. Additionally, the guide part may have a structure that disposes the battery tab at a particular location by preventing lateral displacement (e.g., from flowing to the left and right) of the battery tab during the transferring process.

The guide part may have a structure in which an interval is adjusted based on a width of the battery tab to be transferred. Therefore, battery tabs of various sizes may be transferred since the interval of the guide part may be adjusted based on the width of the battery tab to be transferred. Additionally, the guide part may further include an electromagnet member to maintain the position of the tab, prevent displacement (e.g., prevention of flow) and transfer of the tab. The electrode plate may be formed of a coating part coated with an electrode mixture containing an electrode active material on a current collector of a metal sheet and a non-coating part where the electrode mixture is not coated and the metal sheet may be exposed.

According to another aspect of the present disclosure, an electrode for a secondary battery may be manufactured by the battery tab-feeding device. Specifically, the electrode for a secondary battery may be a positive electrode. According to another aspect of the present disclosure, an electrode assembly including the electrode for a secondary battery may be manufactured by the electrode tab-feeding device. Specifically, the electrode assembly may be a structure having a layered spiral arraignment (e.g., jelly-roll type) electrode assembly.

According to yet another aspect of the present disclosure, a secondary battery may include the electrode assembly and a device including the secondary battery. The device may be selected from the group consisting of a mobile phone, a tablet computer, a notebook computer, a power tool, a wearable electronic device, an electric vehicle, a hybrid electric vehicle, a plug-in hybrid electric vehicle, and a power storage device. The structures and manufacturing methods of such devices are well known in the art, so detailed description thereof will be omitted in the present disclosure.

As described above, an electrode tab-feeding device including a guide for positioning an electrode tab at particular location according to the present disclosure may reduce a defect rate of an electrode fused with a battery tab and a defect rate of a secondary battery manufactured while including the electrode by including a guide part that guides the transfer of the battery tab to dispose a first side edge of the battery tab perpendicular to a first side edge of an electrode plate. Accordingly, the battery tab positioned by a tab transfer unit may prevent lateral displacement when the battery tab is transferred to a first side end part of the electrode plate and may prevent abnormal fusion onto the electrode plate and the resulting defects.

Additionally, the battery tab-feeding device according to the present disclosure may improve the manufacturing efficiency of the secondary battery and the economic efficiency of the manufacturing process. Accordingly, the transfer accuracy of the battery tab may be improved during the process of manufacturing the electrode by fusing the battery tab to the electrode plate.

FIG. 1 is an exemplary schematic view of a tab transferring part 100 including an upper holder 110 and a lower holder 120 which constitute a part of a conventional battery tab-feeding device of the related art. Referring to FIG. 1, a first side end part of each of the upper holder 110 and the lower holder 120 is connected to a main body (not shown) of the battery tab-feeding device, and the upper holder and the lower holder hold a battery tab 300 while the interval therebetween is adjusted, and transfer the battery tab 300 to an electrode plate (not shown) placed on an electrode plate supporting part located at the end of the direction of the arrow. In particular, in the conventional battery tab-feeding device, lateral displacement occurs during the process of transferring the battery tab toward the electrode plate while attempting to maintain a fixed position of the battery tab. Accordingly, transfer of the battery tab while adjusting the desired position and direction on the electrode plate is difficult.

In other words, failure of the electrode the secondary battery including the electrode results from the inability to maintain a fixed position of the battery tab. In particular, in a layered spiral arrangement (e.g., jelly-roll type) electrode assembly, when the battery tab is abnormally transferred to the electrode plate and then the fused positive electrode and negative electrode, and a separator interposed therebetween are wound together, the thickness and shape of an electrode assembly thus manufactured are not uniform, resulting in defective products being discarded.

Figure 2:
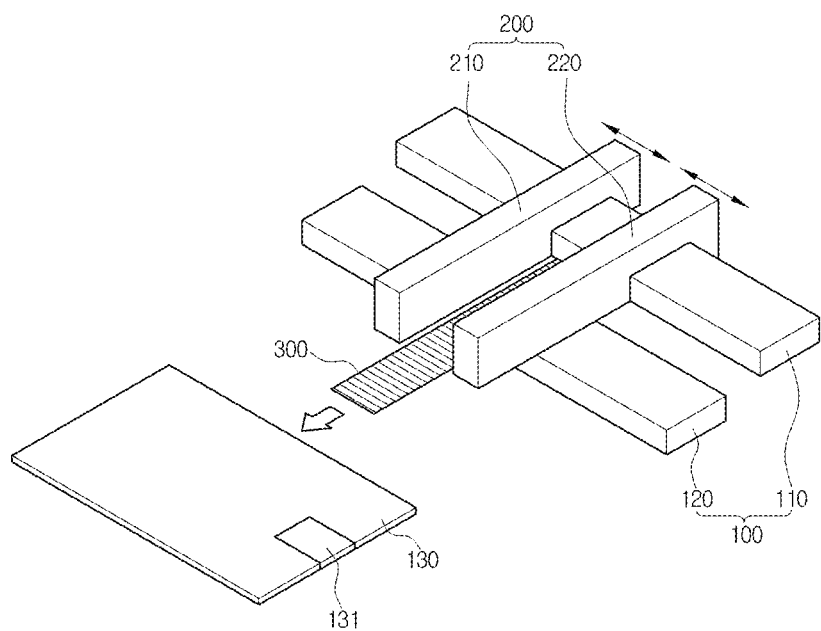
FIG. 2 is an exemplary partial schematic view of a battery tab-feeding device having a guide part according to an exemplary embodiment of the present disclosure.

FIG. 2 is an exemplary partial schematic view of a battery tab-feeding device having a guide part according to an exemplary embodiment of the present disclosure. Referring to FIG. 2, a tab transferring part 100 may include an upper holder 110 and a lower holder 120, and first side end part of the holder may be coupled to a main body (not shown) of the battery tab-feeding device. A guide part 200 having a pair of guide parts 210, 220 may be disposed on an upper surface of the upper holder 110. The guide parts may be disposed at a similar interval as the width of a battery tab 300 and may be transferred in the direction of the arrow while the tab transferring part 100 maintains the position of the battery tab 300. In particular, the battery tab 300 may be transferred to the electrode plate without lateral displacement (e.g., flowing left and right). Therefore, the battery tab 300 may be more accurately transferred on the electrode plate transfer the battery tab 300 to an electrode plate (not shown) placed on an electrode plate supporting part (130) located at the end of the direction of the arrow, to the desired position and direction by the adjustment of the tab transferring part 100. The electrode plate supporting part (130) may further include an electrode plate fixing part (131) to maintain the position of the electrode plate to thereby more accurately control the transfer position and direction when the battery tab is transferred. The specific example of the electrode plate fixing part (131) is not particularly limited when the electrode plate is fixed and may include a clip or a clamp.

Accordingly, the manufacturing efficiency may be improved due to the reduction of defects attributed to lateral displacement of the battery tab. Additionally, the fast fusing of the battery tab in the manufacturing process may provide improved economic efficiency in the manufacturing process. In particular, since the width of the battery tab may vary, the installation position on the upper holder may be adjusted as a preferable shape of the guide, so that the interval of the guide part may be adjusted to the width of the battery tab.

Figure 3:
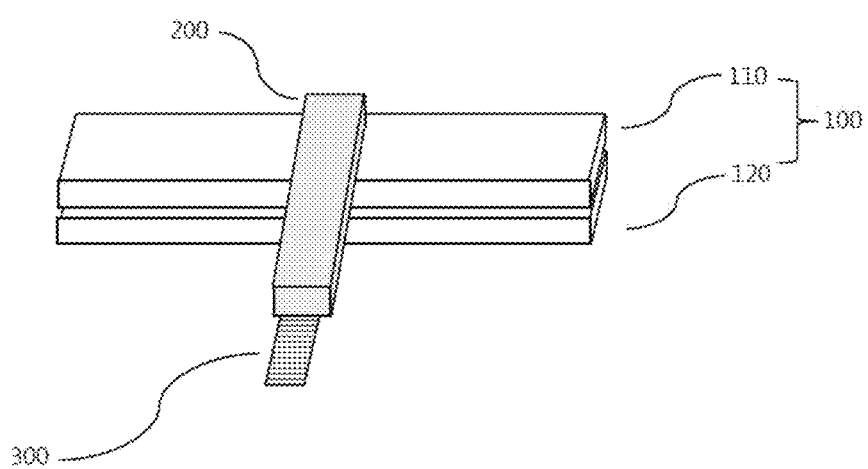
FIG. 3 is an exemplary partial schematic view of a battery tab-feeding device having a guide part according to another exemplary embodiment of the present disclosure

FIG. 3 is an exemplary partial schematic view of a battery tab-feeding device having a guide part according to an exemplary embodiment of the present disclosure. Referring to FIG. 3, a tab transferring part 100 may include an upper holder 110 and a lower holder 120 and a guide part 200 having an electromagnet member on an upper surface of the upper holder.

Since a battery tab is made of a metal material, when a current is supplied to an electromagnet included in the guide part, the battery tab may be coupled to the guide part and may be transferred in the direction of an electrode plate absent lateral displacement. Therefore, the battery tab may be more easily transferred to a desired position by disconnecting the current of the electromagnet after adjusting the position and direction of the battery tab to be fused.

While the disclosure has been described with reference to the drawings according to the exemplary embodiments thereof, it will be understood by those skilled in the art that various changes and modifications may be made based on the descriptions given herein without departing from the scope of the disclosure.

The invention claimed is:

1. A battery tab-feeding device, comprising:
   a battery tab disposed on a non-coating part of an electrode plate during manufacturing of an electrode by fusing the battery tab to the non-coating part of the electrode plate;
   an electrode plate supporting part disposed to support the electrode plate to expose a first surface from both surfaces of the electrode plate;
   a tab transferring part disposed to support the battery tab and directly transfer the battery tab to the non-coating part of the electrode plate and maintain the position of the battery tab relative to the electrode plate during fusing; and
   a guide part that guides the transfer of the battery tab to dispose a first side edge of the battery tab perpendicular to a first side edge of the electrode plate, the guide part being coupled to the tab transferring part so as to have a shape that protrudes in a direction in which the tab transferring part transfers the battery tab, the guide part being configured to contact a portion of the battery tab extending from the tab transferring part,
   wherein the guide part has an adjustable interval based on a width of the battery tab such that lateral sides of the guide part are configured to contact lateral sides of the battery tab.

2. The battery tab-feeding device of claim 1, wherein the electrode plate supporting part further comprises: an electrode plate fixing part that prevents displacement of the electrode plate.

3. The battery tab-feeding device of claim 2, wherein the electrode plate fixing part is a clip or a clamp.

4. The battery tab-feeding device of claim 1, wherein the tab transferring part includes an upper holder that prevents displacement of an upper portion of the battery tab and a lower holder that prevents displacement of a lower portion of the battery tab.

5. The battery tab-feeding device of claim 4, wherein the upper holder is coupled to the guide part.

6. The battery tab-feeding device of claim 1, wherein the guide part is formed from a metal material.

7. The battery tab-feeding device of claim 1, wherein the guide part prevents lateral displacement of the battery tab during a transferring process.

8. The battery tab-feeding device of claim 1, wherein the electrode plate is formed of a coating part coated with an electrode mixture containing an electrode active material on a current collector of a metal sheet and a non-coating part where the electrode mixture is not coated and the metal sheet is exposed.

9. An electrode for a secondary battery manufactured by the battery tab-feeding device according to claim 1.

10. A battery tab-feeding device comprising:
    a battery tab disposed on a non-coating part of an electrode plate during manufacturing of an electrode by fusing the battery tab to the non-coating part of the electrode plate;
    an electrode plate supporting part disposed to support the electrode plate to expose a first surface from both surfaces of the electrode plate;
    a tab transferring part disposed to support the battery tab and directly transfer the battery tab to the non-coating part of the electrode plate and maintain the position of the battery tab relative to the electrode plate during fusing; and
    a guide part that guides the transfer of the battery tab to dispose a first side edge of the battery tab perpendicular to a first side edge of the electrode plate, the guide part being coupled to the tab transferring part so as to have a shape that protrudes in a direction in which the tab transferring part transfers the battery tab, the guide part being configured to contact an upper surface of the battery tab extending from the tab transferring part,
    wherein the guide part includes an electromagnet member.

* * * * *